US006991368B2

(12) United States Patent
Gerlitz (10) Patent No.: US 6,991,368 B2
(45) Date of Patent: Jan. 31, 2006

(54) INFRARED THERMOMETER (76) Inventor: Jonathan Gerlitz, 24 Uri Street, Herzlia (IL)

( * ) Notice: Subject to any disclaimer, the term of this patent is extended or adjusted under 35 U.S.C. 154(b) by 0 days.

(21) Appl. No.: 10/246,246

(22) Filed: Sep. 17, 2002

(65) Prior Publication Data
US 2003/0016728 A1 Jan. 23, 2003

Related U.S. Application Data (60) Continuation of application No. 10/199,429, filed on Jul. 18, 2002, now Pat. No. 6,811,306, which is a division of application No. 09/395,797, filed on Sep. 14, 1999, now Pat. No. 6,435,711.

(30) Foreign Application Priority Data

Sep. 15, 1998 (IL) .................................. 126224

(51) Int. Cl.
G01J 5/04 (2006.01)
G01J 5/32 (2006.01)
G01K 1/16 (2006.01)
G01K 3/08 (2006.01)

(52) U.S. Cl. ...................... 374/121; 374/131; 374/163; 374/208; 600/474

(58) Field of Classification Search ................ 374/120, 374/121, 133, 158, 208, 179, 163, 132; 600/549, 600/464, 474, 473, 306, 300
See application file for complete search history.

(56) References Cited

U.S. PATENT DOCUMENTS 3,273,395 A * 9/1966 Schwarz ...................... 374/133
3,626,757 A * 12/1971 Benzinger ................... 600/549
3,856,693 A 12/1974 Kim 3,878,836 A 4/1975 Twentier
3,935,744 A 2/1976 Beckman
3,949,740 A 4/1976 Twentier (Continued)

FOREIGN PATENT DOCUMENTS

EP 1065486 A1 * 1/2001

(Continued)

OTHER PUBLICATIONS

Derwent Week Ltd. 200327. Infrared ear thermometer has exchangeable probe cover with automatic mode switch. Jan. 2003.*

Primary Examiner—Gail Verbitsky
(74) Attorney, Agent, or Firm—Knobbe, Martens, Olson & Bear LLP (57) ABSTRACT An infrared ear thermometer includes a detector head housing, a heat sink, a recess formed in the heat sink, a thermopile sensor mounted within the recess, a thermistor, and temperature determination circuitry. The recess defines an aperture that limits the field of view of the thermopile sensor. The thermal capacities and conductivities of the heat sink and the thermopile sensor are selected so that the output signal of the thermopile sensor stabilizes during a temperature measurement. A method of determining temperature using the ear thermometer takes successive measurements, stores the measurements in a moving time window, averages the measurements in the moving window, determines whether the average has stabilized, and outputs an average temperature. A method of calculating a subject's temperature determines the temperature of a cold junction of the thermopile, looks up a bias and slope of the thermopile based upon the temperature of the cold junction, measures the output of the thermopile, and calculates the subject's temperature based upon a linear relationship between the output and the subject's temperature. The linear relationship is defined by the bias and the slope.

13 Claims, 10 Drawing Sheets

U.S. PATENT DOCUMENTS

| | | | | |
|---|---|---|---|---|
| 4,151,831 A | * | 5/1979 | Lester | 600/549 |
| 4,161,880 A | | 7/1979 | Prosky | |
| 4,191,197 A | | 3/1980 | Benzinger | |
| 4,574,792 A | | 3/1986 | Trick | |
| 4,602,642 A | | 7/1986 | O'Hara et al. | |
| 4,634,294 A | | 1/1987 | Christol et al. | |
| 4,636,091 A | | 1/1987 | Pompei et al. | |
| 4,662,360 A | | 5/1987 | O'Hara et al. | |
| 4,784,149 A | | 11/1988 | Berman et al. | |
| 4,790,324 A | | 12/1988 | O'Hara et al. | |
| 4,797,840 A | | 1/1989 | Fraden | |
| 4,849,885 A | | 7/1989 | Stillwagon et al. | |
| D303,008 S | | 8/1989 | O'Hara et al. | |
| 4,854,730 A | | 8/1989 | Fraden | |
| 4,895,164 A | | 1/1990 | Wood | |
| 4,900,162 A | | 2/1990 | Beckman et al. | |
| 4,907,895 A | | 3/1990 | Everest | |
| 4,932,789 A | | 6/1990 | Egawa et al. | |
| 4,993,419 A | | 2/1991 | Pompei et al. | |
| 4,993,424 A | | 2/1991 | Suszynski et al. | |
| 5,012,813 A | * | 5/1991 | Pompei et al. | 128/664 |
| 5,017,018 A | | 5/1991 | Iuchi et al. | |
| 5,018,872 A | | 5/1991 | Suszynski et al. | |
| 5,024,533 A | | 6/1991 | Egawa et al. | |
| 5,046,482 A | | 9/1991 | Everest | |
| 5,056,929 A | | 10/1991 | Watanabe et al. | |
| 5,088,834 A | | 2/1992 | Howe et al. | |
| 5,115,815 A | | 5/1992 | Hansen | |
| 5,131,411 A | | 7/1992 | Casali et al. | |
| 5,150,969 A | | 9/1992 | Goldberg et al. | |
| 5,159,936 A | | 11/1992 | Yelderman et al. | |
| 5,163,418 A | | 11/1992 | Fraden et al. | |
| 5,167,235 A | | 12/1992 | Seacord et al. | |
| 5,169,235 A | | 12/1992 | Tominaga et al. | |
| 5,179,936 A | | 1/1993 | O'Hara et al. | |
| 5,199,436 A | | 4/1993 | Pompei et al. | |
| 5,211,873 A | | 5/1993 | Dams et al. | |
| D337,534 S | | 7/1993 | Swift | |
| D338,412 S | | 8/1993 | Curbbun | |
| 5,232,284 A | | 8/1993 | Egawa et al. | |
| RE34,507 E | | 1/1994 | Egawa et al. | |
| 5,293,877 A | | 3/1994 | O'Hara et al. | |
| 5,325,863 A | | 7/1994 | Pompei | |
| 5,333,622 A | | 8/1994 | Casali et al. | |
| 5,333,784 A | | 8/1994 | Pompei | |
| 5,340,215 A | * | 8/1994 | Makita et al. | 374/121 |
| RE34,789 E | | 11/1994 | Fraden | |
| 5,368,038 A | | 11/1994 | Fraden | |
| 5,381,796 A | | 1/1995 | Pompei | |
| 5,445,158 A | | 8/1995 | Pompei | |
| 5,458,121 A | | 10/1995 | Harada | |
| 5,469,855 A | | 11/1995 | Pompei et al. | |
| 5,479,931 A | | 1/1996 | Mooradian | |
| 5,516,010 A | | 5/1996 | O'Hara et al. | |
| D370,860 S | | 6/1996 | Pompei et al. | |
| 5,522,662 A | | 6/1996 | Shiokawa | |
| 5,588,748 A | | 12/1996 | Nomura et al. | |
| 5,609,564 A | | 3/1997 | Makita et al. | |
| 5,626,139 A | | 5/1997 | Szeles et al. | |
| 5,626,147 A | | 5/1997 | Lackey | |
| 5,628,323 A | | 5/1997 | Pompei | |
| 5,645,350 A | | 7/1997 | Jang | |
| 5,653,238 A | | 8/1997 | Pompei | |
| 5,653,239 A | | 8/1997 | Pompei et al. | |
| 5,673,692 A | * | 10/1997 | Schulze et al. | 600/301 |
| 5,695,283 A | | 12/1997 | Johnson | |
| 5,707,343 A | | 1/1998 | O'Hara et al. | |
| 5,738,441 A | * | 4/1998 | Cambridge et al. | 374/102 |
| 5,857,777 A | | 1/1999 | Schuh | |
| 5,874,736 A | | 2/1999 | Pompei | |
| 5,893,833 A | * | 4/1999 | Pompei et al. | 600/549 |
| 5,938,619 A | | 8/1999 | Dogre Cuevas | |
| 5,967,992 A | | 10/1999 | Canfield | |
| 6,002,953 A | | 12/1999 | Block | |
| 6,029,665 A | | 2/2000 | Berthon-Jones | |
| 6,036,361 A | | 3/2000 | Gregory et al. | |
| 6,045,257 A | | 4/2000 | Pompei et al. | |
| 6,047,205 A | | 4/2000 | Pompei | |
| 6,048,093 A | | 4/2000 | Pompei | |
| 6,056,435 A | | 5/2000 | Pompei | |
| 6,059,452 A | | 5/2000 | Smith et al. | |
| 6,109,782 A | * | 8/2000 | Fukura et al. | 374/131 |
| 6,129,673 A | | 10/2000 | Fraden | |
| 6,149,298 A | * | 11/2000 | Kraus et al. | 374/133 |
| 6,155,712 A | | 12/2000 | Egawa | |
| 6,203,194 B1 | | 3/2001 | Beerwerth et al. | |
| 6,238,089 B1 | * | 5/2001 | Vodzak et al. | 374/208 |
| 6,286,992 B1 | | 9/2001 | Kyrtsos | |
| 6,292,685 B1 | | 9/2001 | Pompei | |
| 6,305,840 B1 | | 10/2001 | Kim et al. | |
| 6,319,206 B1 | * | 11/2001 | Pompei et al. | 600/549 |
| 6,332,090 B1 | * | 12/2001 | DeFrank et al. | 600/474 |
| 6,386,757 B1 | * | 5/2002 | Konno | 374/158 |
| 6,402,371 B2 | | 6/2002 | Pompei et al. | |
| 6,418,317 B1 | | 7/2002 | Cuffaro et al. | |
| 6,439,768 B1 | * | 8/2002 | Wu et al. | 374/169 |
| 6,489,133 B2 | | 12/2002 | Phillips et al. | |
| 6,547,744 B1 | * | 4/2003 | Pompei et al. | 600/549 |
| 6,733,464 B2 | * | 5/2004 | Olbrich et al. | 600/538 |
| 2002/0114375 A1 | * | 8/2002 | Pompei | 374/133 |
| 2002/0123690 A1 | | 9/2002 | Fraden | |
| 2002/0176479 A1 | * | 11/2002 | Hur et al. | 374/131 |
| 2003/0067958 A1 | * | 4/2003 | Jang | 374/131 |
| 2004/0047392 A1 | * | 3/2004 | Wu et al. | 374/121 |
| 2004/0057494 A1 | | 3/2004 | Tsao et al. | |
| 2004/0095985 A1 | * | 5/2004 | Ko et al. | 374/100 |
| 2005/0043631 A1 | * | 2/2005 | Fraden | 600/474 |
| 2005/0094705 A1 | * | 5/2005 | Chi | 374/121 |

FOREIGN PATENT DOCUMENTS

| JP | 2001029317 A | * | 2/2001 |
| KR | 2003074885 A | * | 9/2003 |

* cited by examiner

INFRARED THERMOMETER

RELATED APPLICATIONS

This application is a continuation of U.S. application Ser. No. 10/199,429, filed Jul. 18, 2002 now U.S. Pat. No. 6,811,306, which is a division of U.S. application Ser. No. 09/395,797, filed Sep. 14, 1999, now U.S. Pat. No. 6,435,711, issued Aug. 20, 2002, both of which are hereby incorporated by reference.

BACKGROUND OF THE INVENTION

1. Field of the Invention

This invention relates generally to temperature measurement and, more particularly, the invention relates to infrared clinical thermometers.

2. Description of the Related Art

Conventional ear thermometers employ an infrared (IR) detector for sensing the temperature inside the ear at the tympanic membrane. The infrared detector is mounted within a heat sink so as to stabilize an ambient reference temperature. As conventionally mounted, the detector is too large to be inserted into the ear canal leading to the tympanic membrane. Accordingly, a waveguide, typically formed of a polished tube, is interposed between the tympanic membrane and the IR detector. The use of a waveguide involves a number of drawbacks resulting, for example, from its non-zero emissivity, its relatively high cost, and the complexity of the resultant structure.

SUMMARY OF THE INVENTION

One embodiment of the invention is an infrared ear thermometer. The infrared ear thermometer includes a detector head housing having a heat sink with a recess. A thermopile sensor is mounted in the recess. The recess defines an aperture that limits the field of view of the thermopile sensor. The thermometer also includes a thermal sensor and temperature determination circuitry configured to calculate a temperature in response to output of the thermopile sensor and the thermal sensor.

Another embodiment of the infrared ear thermometer includes a detector head housing having a heat sink with a recess. A thermopile sensor is mounted in the recess. The thermopile sensor has a hot junction and a cold junction, the hot junction being responsive to infrared radiation. An output signal of the thermopile sensor is related to a temperature difference between the hot junction and the cold junction. A thermal capacity of the hot junction, a thermal conductivity between the hot junction and the cold junction, a thermal capacity of the cold junction, a thermal conductivity between the cold junction and the heat sink, and a thermal capacity of the heat sink are selected so that the output signal of the thermopile sensor stabilizes or has a flat peak during a temperature measurement. A thermistor is mounted in thermal communication with the cold junction. Temperature determination circuitry calculates an output temperature in response to the output signal of the thermopile sensor and an output of the thermistor.

Another embodiment of the infrared ear thermometer includes a detector head housing having a heat sink with a recess. A thermopile sensor is mounted in the recess. The thermopile sensor has a hot junction and a cold junction, the hot junction being responsive to infrared radiation. The output signal of the thermopile sensor is related to the temperature difference between the hot junction and the cold junction. A thermistor is mounted in thermal communication with the cold junction. A heat pipe, made of a thermally conductive material, surrounds a portion of the thermopile sensor, whereby the heat pipe prevents heat transfer from an ear canal to the hot junction. Temperature determination circuitry calculates an output temperature in response to the output signal of the thermopile sensor and an output of the thermistor.

Another embodiment of the invention is a method for determining the temperature of a subject. Successive temperature measurements of the subject are taken using an infrared thermometer. A plurality of most recent measurements are stored in a moving time window. An average of up to all of the plurality of stored measurements is successively calculated. The difference between successive averages is calculated and a determination is made whether the difference is less than a predetermined value. Finally, a calculated temperature is output.

Another embodiment of the invention is a method for calculating a subject's temperature based upon output values from a thermopile and a thermistor of an infrared thermometer, wherein the thermistor is in thermal communication with a cold junction of the thermopile, and wherein the hot junction is in infrared communication with an object to be measured. The temperature of the cold junction is determined with the thermistor. A bias and a slope of the thermopile are looked up in a lookup table based upon the temperature of the cold junction. The output signal of the thermopile is measured. Finally, a temperature is calculated based upon a linear relationship defining temperature as a function of the output signal of the thermopile in terms of the bias and the slope.

Another embodiment of the invention is an infrared thermometer for measuring temperature of a subject's forehead. The infrared ear thermometer includes a detector head having a metal heat sink. A thermopile sensor is mounted to the front of the heat sink with a thermopile sensor mounted in the recess. A thermistor is mounted in thermal communication with a cold junction of the thermopile sensor. The outer surface of the detector head includes an extension for placement against the subject's forehead, wherein the extension forms an air pocket isolating a portion of the forehead from air flow outside the air pocket.

Another embodiment of the infrared thermometer for measuring temperature of a subject's forehead includes a detector head having a metal heat sink. A thermopile sensor is mounted to the front of the heat sink with a thermopile sensor mounted in the recess. A first temperature sensor measures a cold junction temperature of the thermopile sensor. A second temperature sensor provides fast measurement of a room ambient temperature. An electronic circuit calculates the temperature of the subject based in part upon the input of the second temperature sensor.

Another embodiment of the invention is a detector head housing for an infrared clinical thermometer. The housing includes a body made of a soft plastic material. The body has an outer surface configured to make contact with a subject. A liquid having a high thermal capacity fills a portion of a cavity formed within the body. The high thermal capacity liquid thermally isolates an infrared sensor within the body from heat generated by the subject.

Another embodiment of the infrared ear thermometer includes a detector head housing having a heat sink with a recess. A thermopile sensor is mounted in the recess. A sleeve that defines an aperture that limits the field of view of the thermopile sensor fits into the recess. The thermometer also includes a thermal sensor and temperature determination circuitry configured to calculate a temperature in response to output of the thermopile sensor and the thermal sensor.

BRIEF DESCRIPTION OF THE DRAWINGS

The preferred and other embodiments of the present invention are described below in connection with the drawings in which like reference numbers represent corresponding components throughout, and in which.

DETAILED DESCRIPTION OF THE EMBODIMENTS

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be understood by one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

Figure 1:
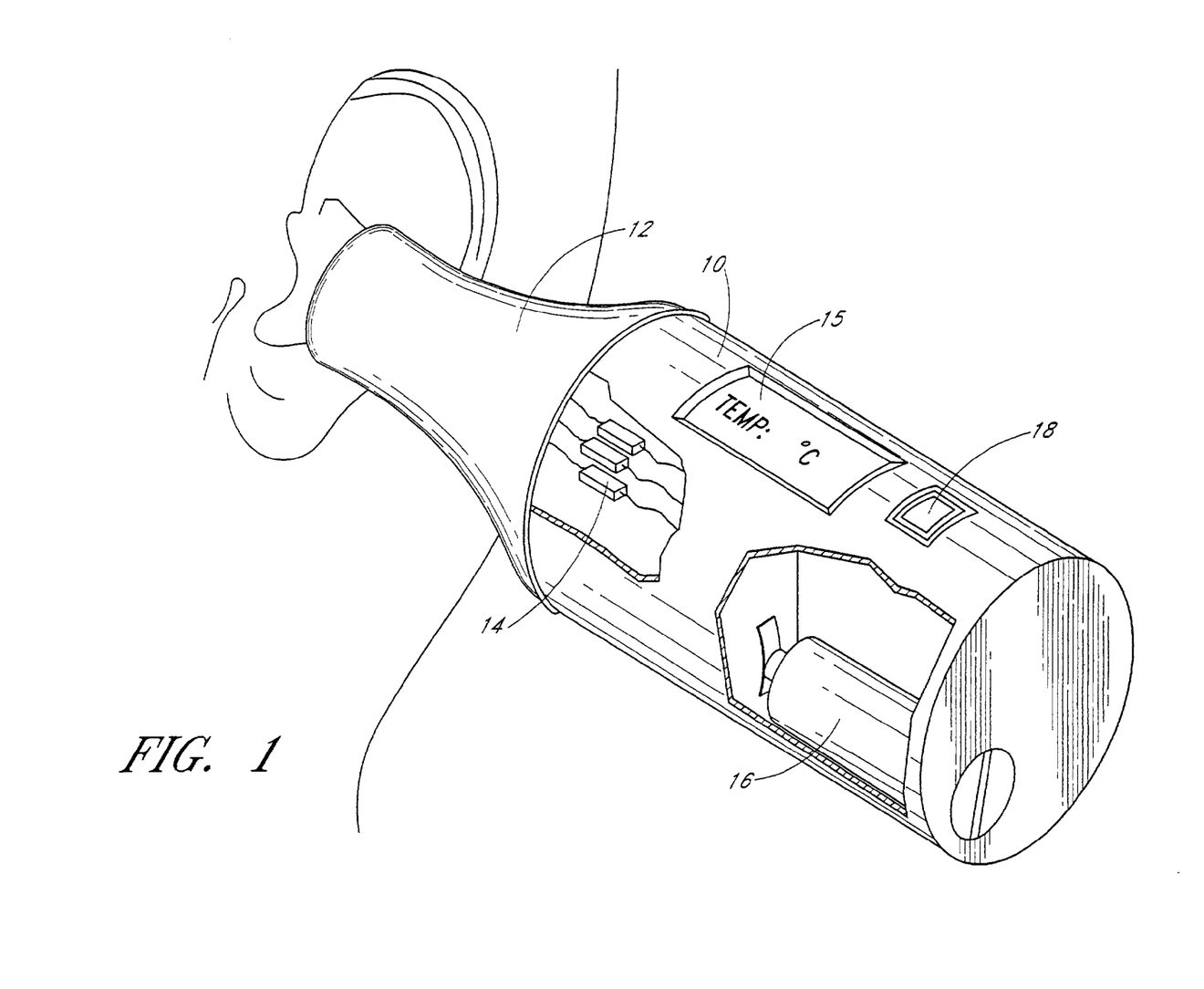
FIG. 1 illustrates an ear thermometer constructed and operative in accordance with a preferred embodiment of the present invention.

FIG. 1 illustrates an ear thermometer constructed and operative in accordance with a preferred embodiment of the present invention. The ear thermometer comprises a hand held housing 10, in which is disposed a detector head 12, temperature determining circuitry 14, which receives inputs from the detector head 12, and a display 15 for displaying a visible indication of measured temperature. An electrical power source 16 and optional audio output device 18 are also provided.

Figure 2:
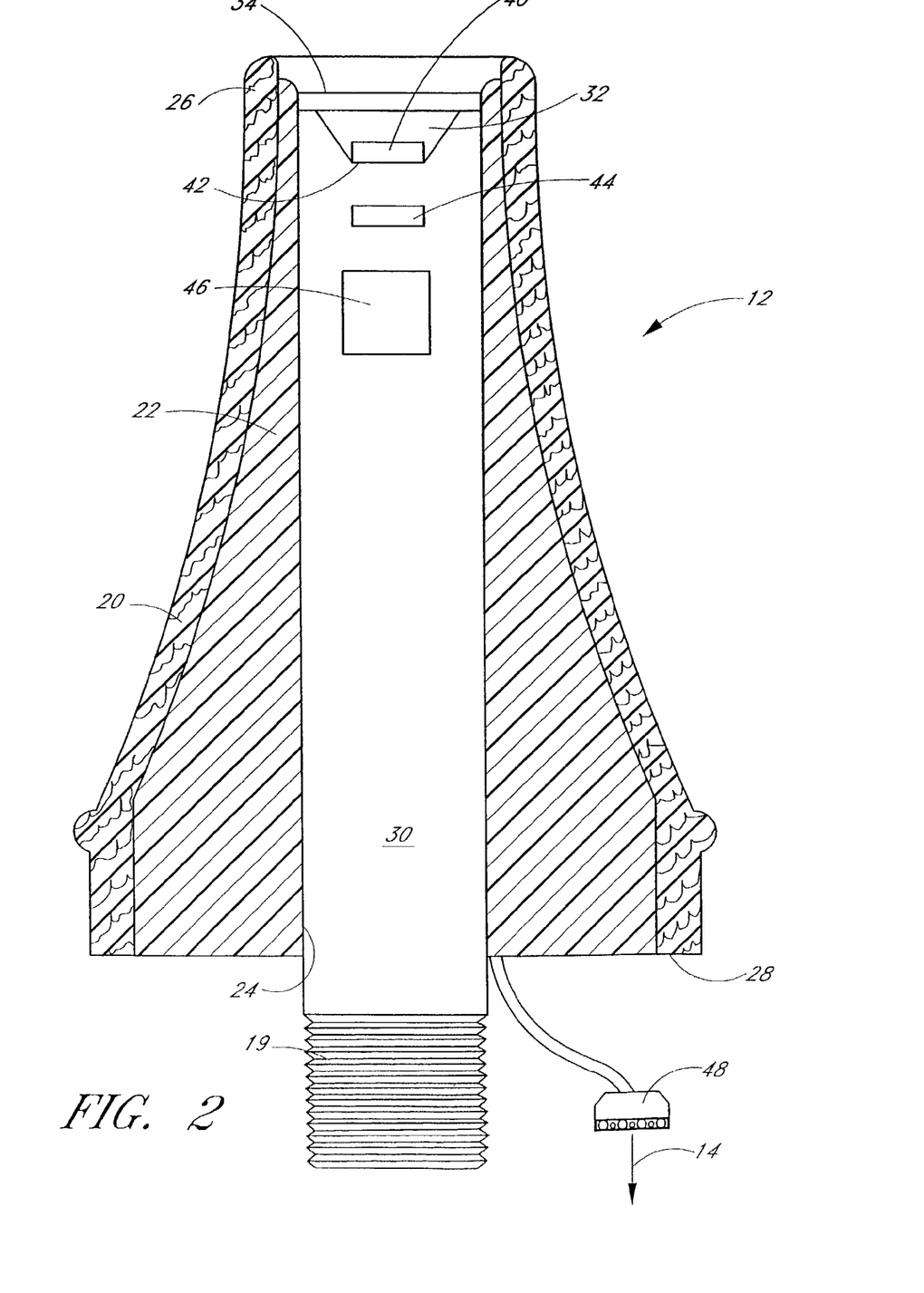
FIG. 2 illustrates a cross section of a detector head in accordance with a preferred embodiment of the ear thermometer.

FIG. 2 illustrates a cross section of the detector head 12. The detector head 12 includes a tapered, generally conical, concavely curved outer surface 20 preferably formed of a soft thermal insulator such as foamed polyurethane. The detector head 12 is configured to engage the ear canal of a subject. The outer surface 20 is preferably somewhat flexible, with a hardness equal to or less than Shore 40, which provides a pleasing touch to a human ear. Disposed in the interior of the outer surface 20 is a thermal insulative filler 22, preferably formed of a plastic material, which defines a longitudinal bore 24 extending from a narrow front (distal) end 26 to a rearward (proximal) end 28 of the detector head 12.

Disposed in the bore 24 is a heat sink 30 preferably comprising a high thermal conductivity, high thermal capacity rod. The heat sink 30 is preferably made of copper. The heat sink 30 is preferably dimensioned to fit tightly in the bore 24. In one embodiment, the heat sink terminates in a threaded end 19 with which the detector head 12 is attached to the housing 10. A recess 32 in the heat sink 30 is preferably located adjacent the front end 26. An infrared (IR) transmissive window 34, typically formed of silicon, is preferably hermetically sealed at the front end 26, thus sealing the bore 24. The IR transmissive window 34 is preferably mounted with a thermal adhesive directly onto the heat sink 30 such that the window 34 is in thermal connection with the heat sink 30.

An IR sensor 40 is mounted directly onto a forward facing surface 42 of the heat sink 30 in recess 32 and is positioned so that the recess limits the field of view of the sensor 40 to window 34. The IR sensor 40 thus "sees" the heat sink 30 and the outside, as defined by the field of view, but nothing else. The IR sensor 40 is preferably provided without a conventional housing and is preferably mounted directly on the heat sink 30. In the preferred embodiment, the heat sink 30 serves as the housing for the IR sensor 40. The IR sensor 40 is preferably a thermopile sensor.

A thermistor 44 is preferably mounted inside the heat sink 30 at a location adjacent that of surface 42. Electrical output signals from both the IR sensor 40 and the thermistor 44 are preferably provided to preamplification electronics 46, which can be mounted on the heat sink 30. The output of the preamplification electronics 46 is provided to the temperature determining circuitry 14 (FIG. 1) via a connecting socket 48. In accordance with one embodiment of the invention, the temperature determining circuitry 14 comprises a lookup table that maps actual measured values of the electrical output signals to temperatures, thereby providing a high degree of accuracy.

When the thermometer is inserted into a subject's ear canal, the IR sensor 40 receives IR radiation directly from the ear, with the only intermediary being the window 34. When properly positioned in the ear canal, the IR sensor 40 is preferably located adjacent the tympanic membrane of the subject, at a distance of approximately 2.5 cm. Preferably, no waveguide is employed.

Figure 3:
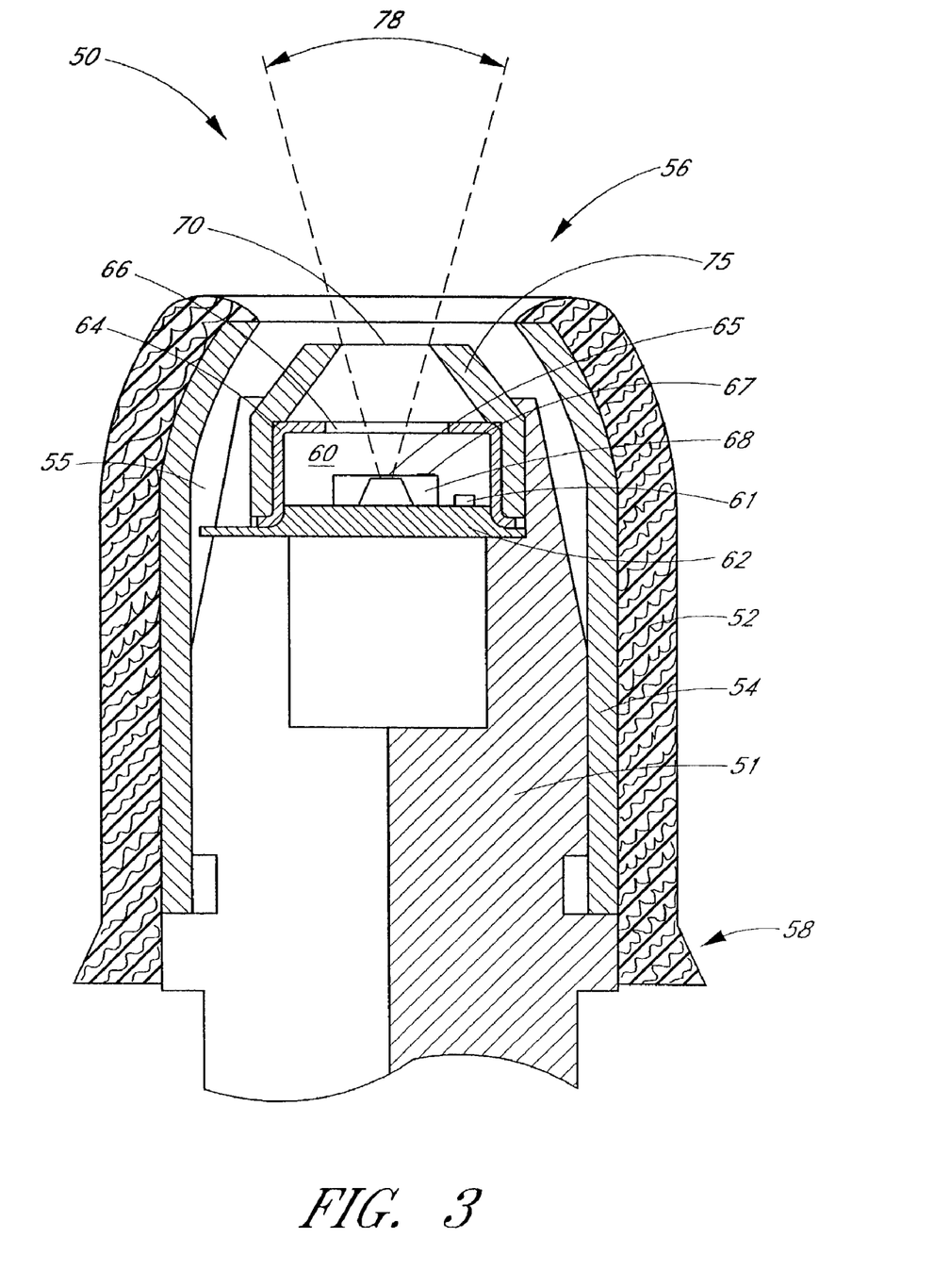
FIG. 3 illustrates a detector head constructed in accordance with an alternative embodiment of the present invention.

FIG. 3 illustrates a detector head 50 constructed in accordance with an alternative embodiment of the present invention. The detector head 50 has a general conical shape with a smaller diameter at the front (distal) end 56 and a larger diameter at the rearward (proximal) end 58. A conical heat sink 51, preferably made of metal, is positioned within the detector head 50. A thermopile detector 60 is mounted on the heat sink 51 near the front end 56.

The thermopile detector 60 is preferably a regular thermopile detector, such as TPS333, made by Heiman, Germany. The thermopile detector 60 preferably comprises a base 62 made of stainless steal, a housing 64 also made of stainless steal, a silicon window 66, a thermopile sensor 68, and a thermistor 61. The thermistor 61 and a cold junction 67 of the thermopile sensor 68 are thermally connected to the base. A hot junction 65 is mounted on a thin membrane such that the thermal conductivity to the cold junction 67 and the base 62 is made as low as possible. Radiant heat striking the hot junction 65 causes the thermopile to produce an output signal directly proportional to the incident radiation. The hot junction temperature is referenced to the cold junction temperature. The cold junction temperature is preferably measured by the thermistor 61.

A sleeve 75 is mounted to the detector housing 64 or to the heat sink 51 or both. The sleeve 75 defines an aperture 70 that limits the field of view 78 of the thermopile sensor 68. The sleeve 75 preferably is made of a metal with a high thermal conductivity, such as copper, and preferably has a polished surface coated with gold. The sleeve 75 and the aperture 70 allow the sensor 68 to receive radiation only from the object to be measured. The sleeve 75 and the aperture 70 also prevent reflections from the sleeve 75 and radiation emitted from the outer parts of the detector head 50 from reaching the hot junction 65 surface. The sleeve 75 is preferably also in contact with the detector housing 64.

A metal heat pipe 54, preferably made of copper coated with nickel or gold, is mounted around the heat sink 51, the detector 60, and the sleeve 75. The metal heat pipe 54 transfers heat from the front end 56 of the head 50 to the heat sink 51, to the thermistor 61, and to the cold junction 67. Accordingly, the heating of the hot junction 65 results from infrared radiation as opposed to heat transfer from the ear canal while the head 50 is inserted into the ear. Furthermore, an air gap 55 between the sleeve 75 and the heat pipe 54 isolates the sleeve 75, the window 66, and the detector housing 64 from heat transfer from the ear canal. An external layer of foamed plastic material 52, such as foamed polyurethane, covers the heat pipe 54. The foamed layer 52 has a very low heat conductivity and therefore isolates the detector head 50 from heat transfer from the ear canal. The foamed layer 52 also provides a soft touch in the ear canal to prevent irritation and make the measurement more comfortable.

Figure 4:
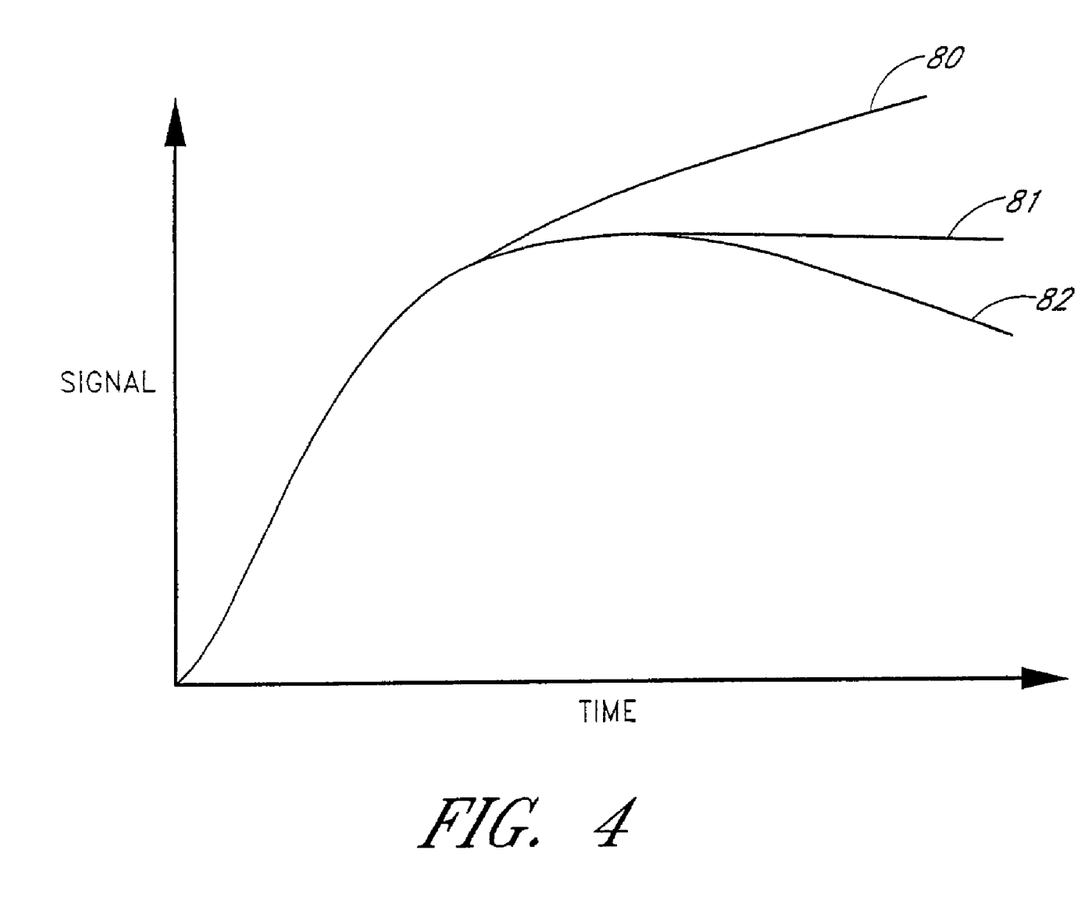
FIG. 4 is a graph of the possible output signals of a thermopile detector as a function of time.

FIG. 4 illustrates plots of the possible output signals of the thermopile detector 60 as a function of time. The output signal of the thermopile detector is proportional to the temperature difference between the hot junction 65 and the cold junction 67. The hot junction 65 is heated by the infrared radiation with a short time constant of about 0.2 seconds. The thermal conductivity between the hot junction 65 and the cold junction 67, the thermal conductivity between the cold junction 67 and the heat sink 51, and the thermal capacity of the heat sink 51 are preferably selected to produce an output signal that stabilizes as shown by a curve 81. Another acceptable configuration produces a curve 82 having a relatively flat peak. A slowly increasing signal with a continuous positive slope as shown by a curve 80 is less desirable.

Figure 5A:
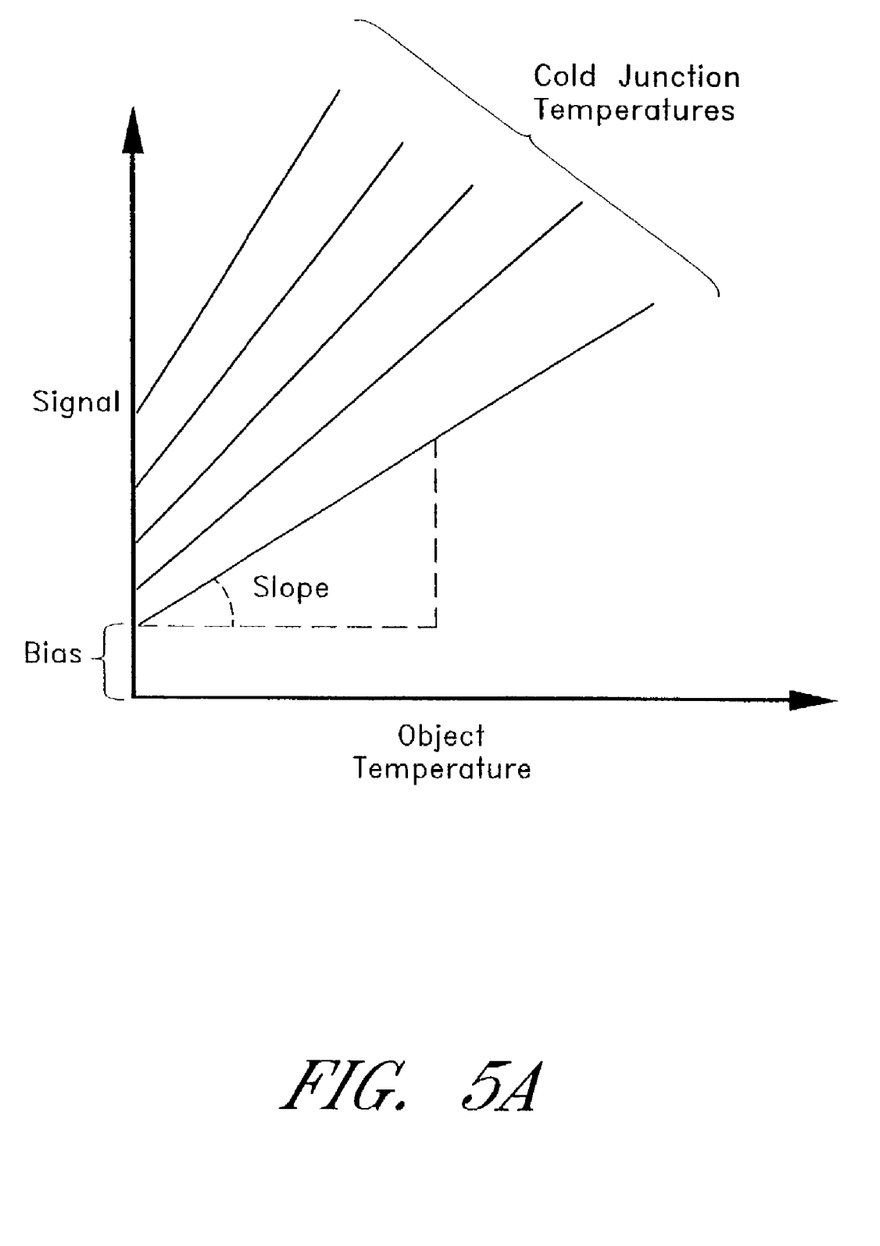
FIG. 5A illustrates a family of plots of the output of the thermopile detector as a function of the temperature of the object being measured.

FIG. 5A illustrates a family of plots of the signal from the thermopile detector 60 as a function of the temperature of the object being measured. Each of the family of lines depicts the relationship between the signal and the measured temperature at a certain ambient temperature of the cold junction 67. For each ambient temperature, the representative line can be described by a bias and a slope as illustrated in FIG. 5A. The temperature determining circuitry 14 preferably stores the bias and the slope of each line in lookup tables. Interpolation can be used to determine the bias and slope for temperatures between those stored in the lookup tables. For certain thermopile detectors, the family of lines may be even be degenerated into one line.

Figure 5B:
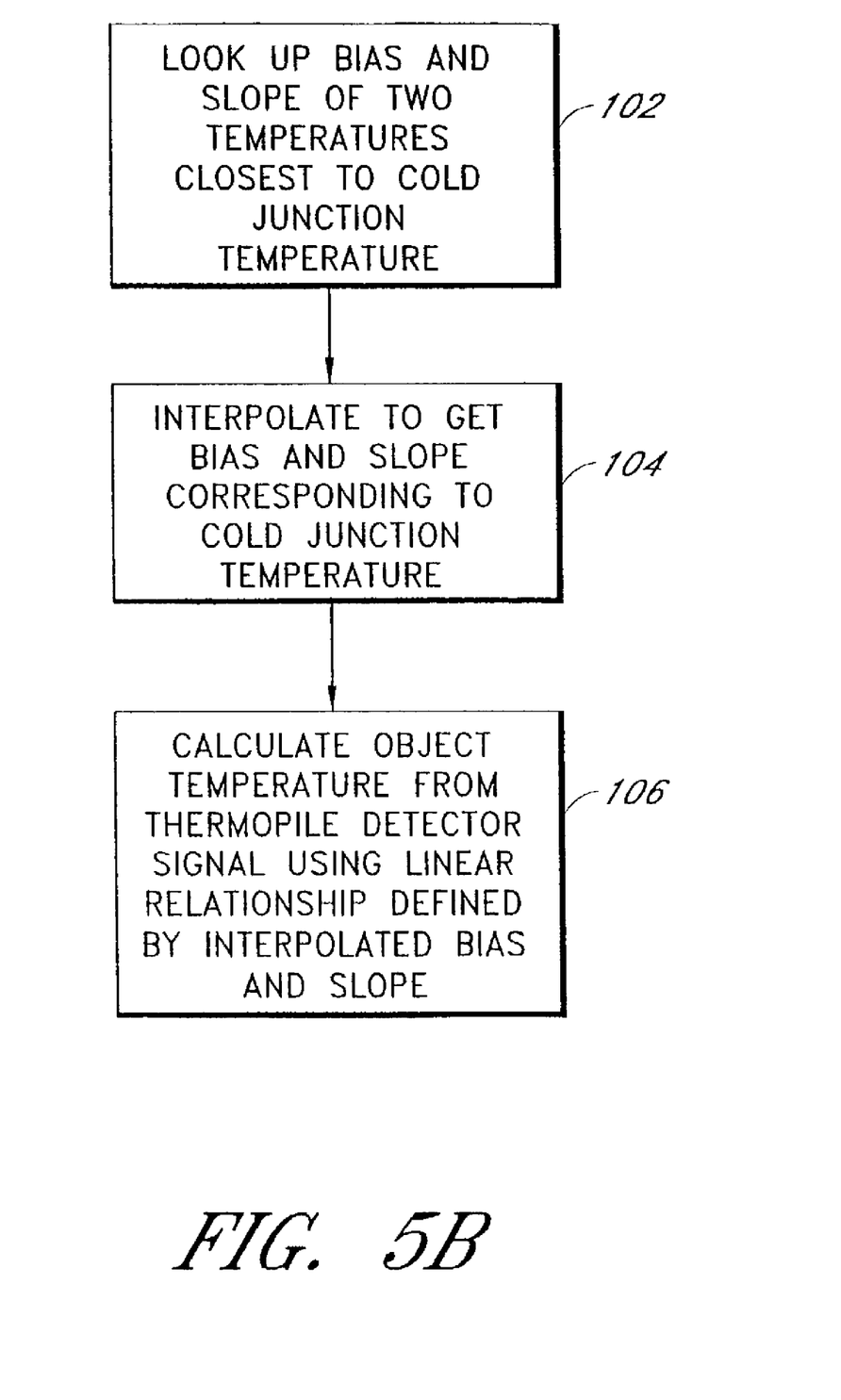
FIG. 5B illustrates a preferred method that can be used in accordance with the present invention to calculate the temperature of an object.

FIG. 5B illustrates a preferred method that can be used in accordance with the present invention to calculate the temperature of an object using the measured temperature of the cold junction 67 and the signal from the thermopile detector 60. At a first step 102, the temperature determining circuitry 14 looks up, in the lookup tables, the bias and slope corresponding to the two temperatures closest to the cold junction temperature. At a step 104, the temperature determining circuitry 14 uses interpolation to determine the bias and slope of a line corresponding to the cold junction temperature. The line defines the linear relationship between object temperature and the signal from the thermopile detector 60 at the cold junction temperature. At a step 106, the temperature determining circuitry 14 uses the linear relationship defined by the interpolated bias and slope to calculate the object temperature based upon the measured thermopile detector signal.

Figure 6:
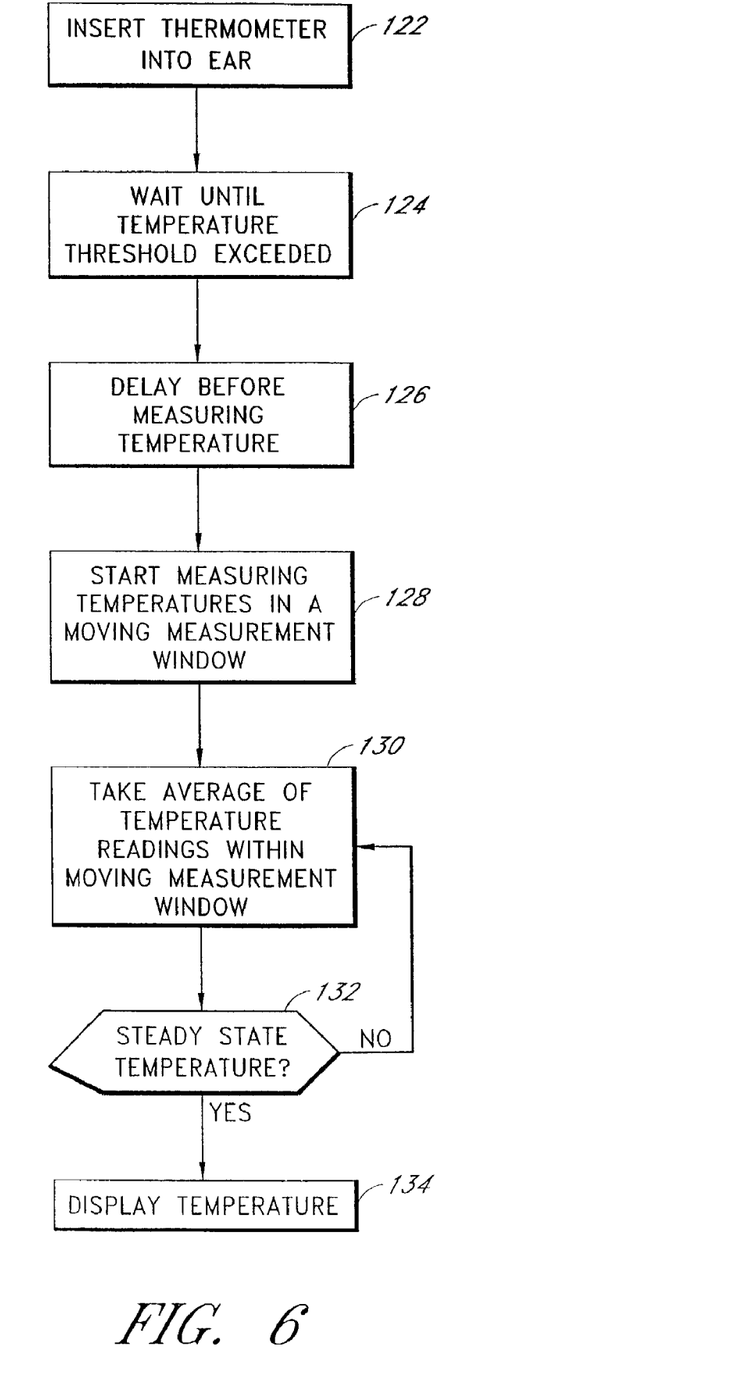
FIG. 6 illustrates a preferred method for measuring temperature in accordance with the present invention.

FIG. 6 illustrates a preferred method for measuring temperature in accordance with the present invention. At a first step 122, the thermometer is inserted into the ear. At a next step 124, the temperature determining circuitry 14 waits until the measured temperature has exceeded a certain threshold, such as 34 C, before proceeding onto a next step 126. This determination can be made without performing the steps of FIG. 5B by generating an approximate conversion of the signal from the thermopile detector 60 to temperature. Alternatively, the determination can be based upon an expected approximate thermopile output at the threshold temperature. At the next step 126, the circuitry 14 imposes a time delay before beginning an ear temperature measurement in order to allow the user enough time to fully insert the thermometer into the ear canal. At a next step 128, the temperature determining circuitry 14 begins taking temperature measurements (i.e., measurements of the output signal from the thermopile detector 60) in a moving measurement window, such as a span of 0.5 seconds. At a next step 130, the temperature determining circuitry 14 moves the measurement window in time and calculates an average temperature (i.e., an average value for the output signal from the thermopile 60) from the measurements in the measurement window. In one embodiment, the temperature determining circuitry 14 may discard peak, high, and/or low readings from the measurement window in calculating the average value of the thermopile signal. At a next step 132, the temperature determining circuitry 14 determines whether a steady state value of the thermopile output signal has been reached. A steady state is preferably reached when the change in the average value within the moving window is less than a predetermined amount. If a steady state value has not been reached at the step 132, control is passed back to the step 130. Otherwise, if a steady state value has been reached at the step 132, the steady state temperature is calculated and displayed at a last step 134 by performing the steps in FIG. 5B to convert the measured thermopile output signal to temperature.

In an alternative embodiment of the method of FIG. 6, the temperature determining circuitry 14 successively stores, instead of a thermopile output value, a calculated temperature in the moving time window. The method proceeds as described above until the calculated average temperature has reached a steady state.

Figure 7:
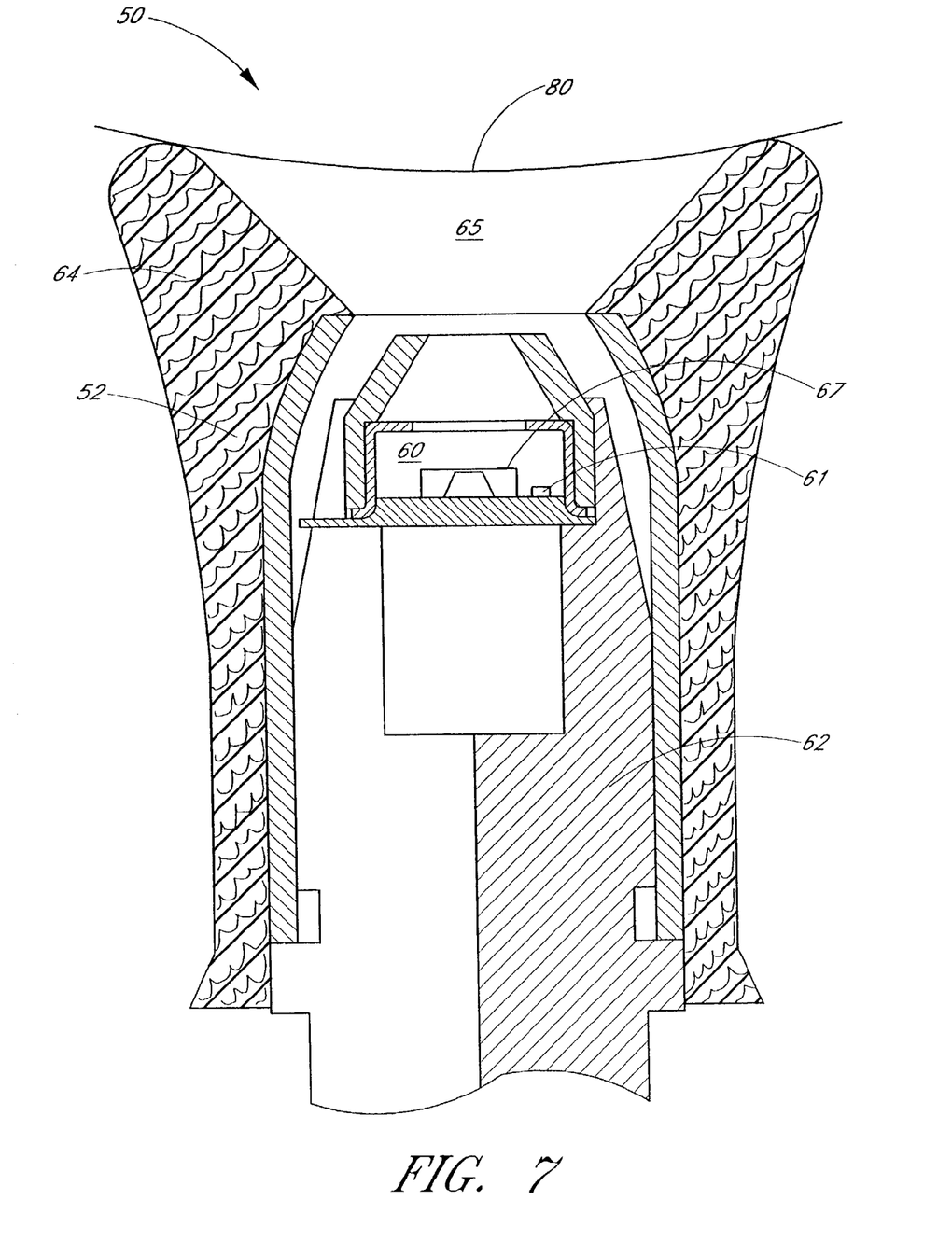
FIG. 7 illustrates a detector head adapted for measuring forehead temperature in accordance with an alternative embodiment of the present invention.

FIG. 7 illustrates an embodiment of the detector head 50 adapted for measuring forehead temperature in accordance with an alternative embodiment of the present invention. An extension 64 to the outer surface 52 provides for placement of the thermometer against a subject's forehead 80. The extension 64 preferably forms an air pocket 65 to isolate a portion of the forehead 80 from air flow outside of the air pocket. An ambient room temperature may be determined by measuring, through the thermistor 61, the temperature of bracket 62. The ambient room temperature may them be taken into account, using known techniques, preferably using a lookup table, in order to determine the temperature of the subject based upon the measured temperature of the subject's forehead. The embodiment of FIG. 7 is preferably stabilized in the room temperature where the measurement is to take place for at least twenty minutes due to the thermal mass of the bracket.

An additional embodiment provides a second thermistor with fast response for measuring ambient room temperature. Corrections can also be added to the lookup table to account for any immediate change in room temperature. By adding a second thermistor with a small thermal mass and good thermal contact to the surrounding air, the required stabilization time may be shortened to less than one minute.

Figure 8:
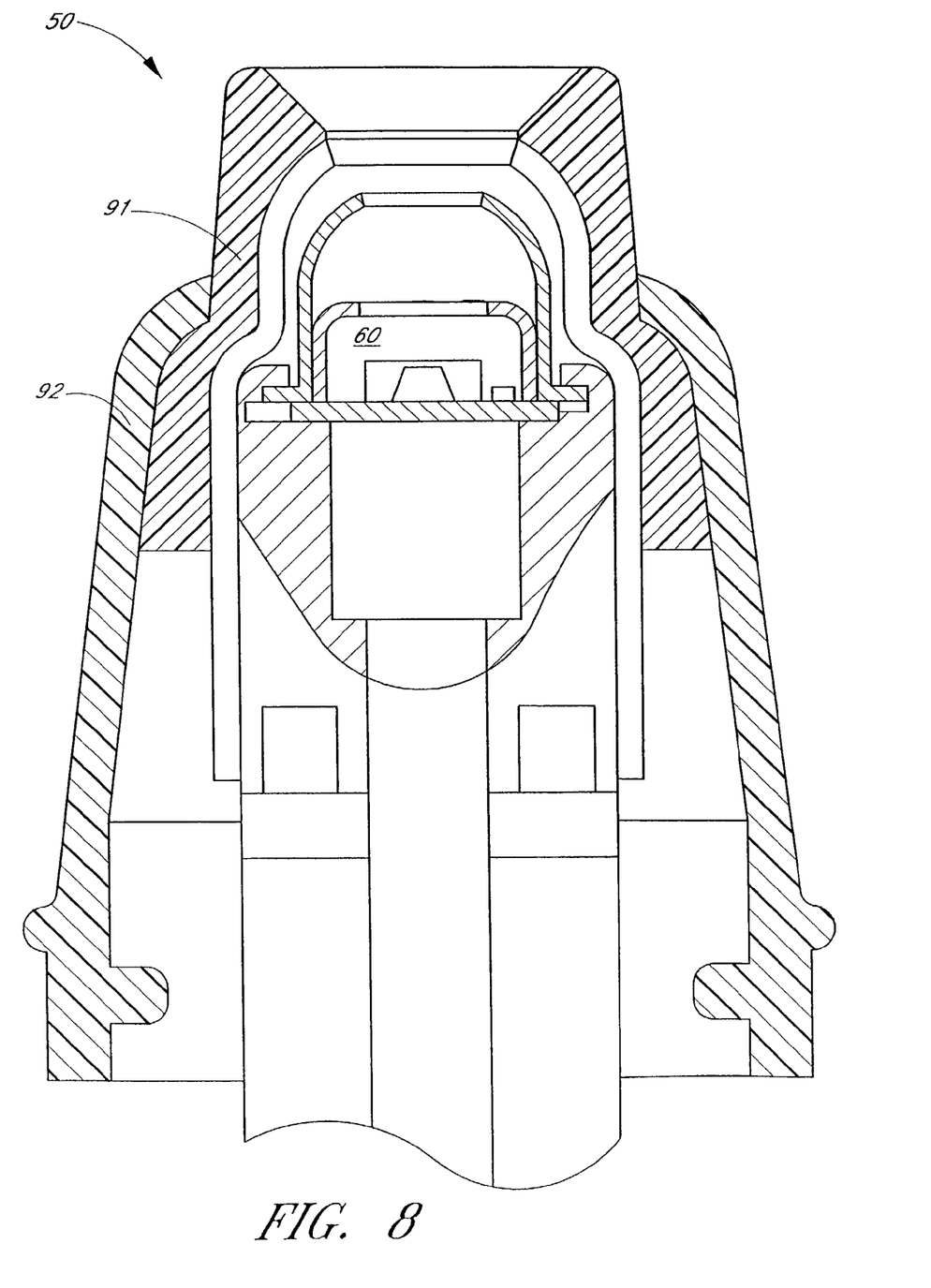
FIG. 8 illustrates an alternative embodiment of the detector head configured to function in conjunction with a variety of ear canal sizes.

FIG. 8 illustrates an alternative embodiment of the detector head 50 configured to function in conjunction with a variety of ear canal sizes. The detector head 50 generally has two main outer diameters. The diameter of the front part 91 is smaller and can be inserted into the ear canal to fix the thermometer direction. The rear part 92 has a much larger diameter, which always stops the detector head 50 at the entrance of the ear canal at a fixed distance from the tympanic membrane. This construction, which keeps the thermometer always at a fixed position in the ear canal, solves one of the main causes of instability in taking temperature measurements from the ear. The front part 91 of the detector head 50 is preferably made of foamed soft plastic material, such as foamed polyurethane, and the rear part 92 is preferably made of a conventional plastic material, such as, for example, ABS.

Figure 9:
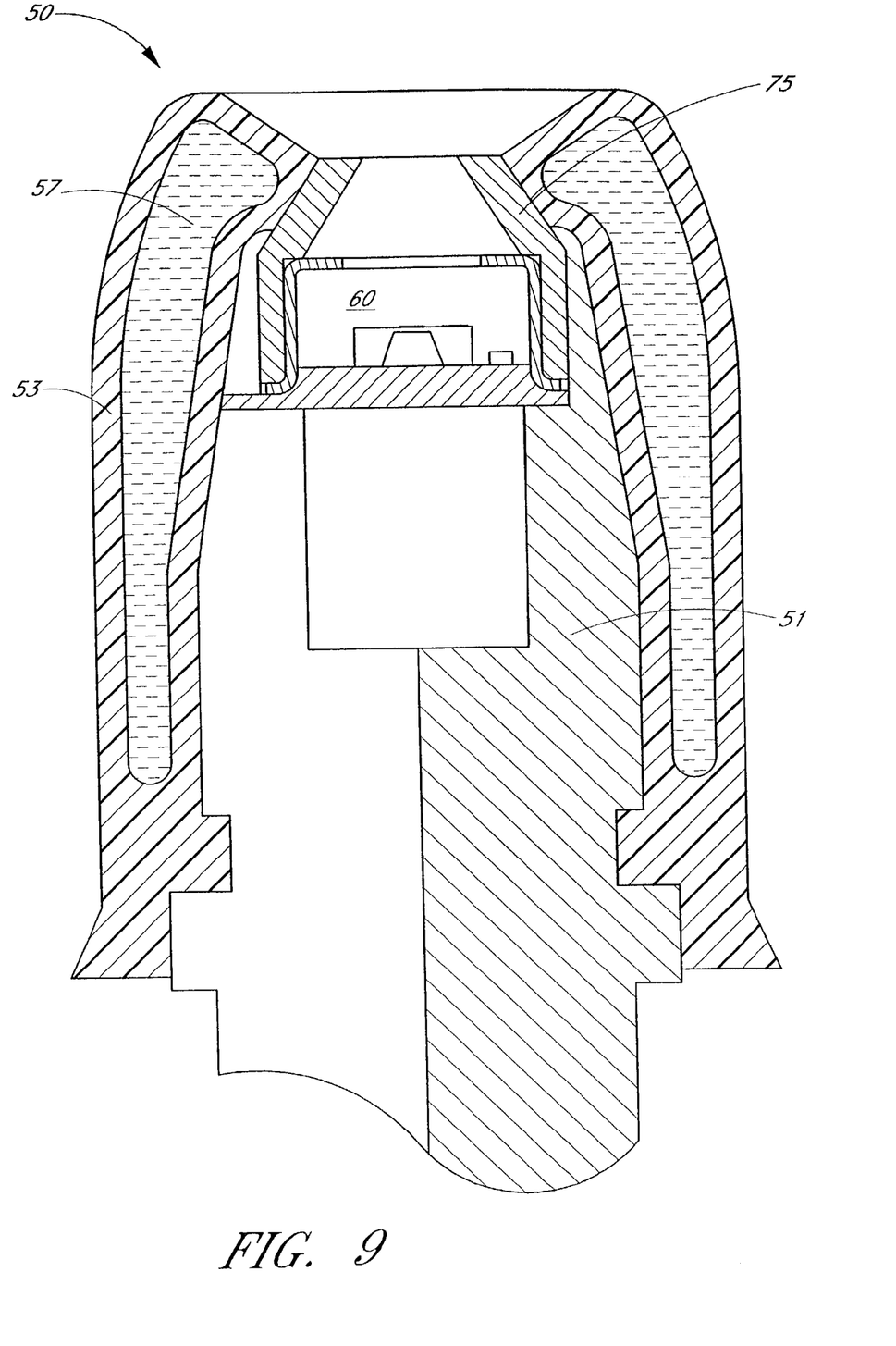
FIG. 9 illustrates an alternative embodiment of the detector head configured to provide improved heat transfer.

FIG. 9 illustrates an alternative embodiment of the detector head 50 configured to provide improved heat transfer. A soft plastic case 53 filled with cooling liquid 57 is mounted around the heat sink 51, the detector 60, and the sleeve 75. The liquid may be any liquid with a high thermal capacity, such as water. The liquid transfers heat from the front end of the detector head 50 to the heat sink 51 and prevents heating of the sleeve 75 by heat transfer. The pressure of the liquid in the soft plastic case provides a comfortable and soft touch when inserted into the ear canal.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A method of detecting human body temperature, the method comprising:
   placing a temperature detector against a forehead to take plural temperature measurements, the temperature detector comprising a radiation sensor which views a target surface area of the forehead, the temperature detector further comprising an extension for placement against the forehead, wherein the extension forms an air pocket isolating a portion of the forehead from air flow outside the air pocket; and
   providing a resulting temperature reading by analyzing the plural temperature measurements made during the step of placing, wherein analyzing the plural temperatures measurements comprises:
      storing a plurality of most recent temperature measurements in a moving time window;
      successively calculating an average of up to all of the plurality of stored measurements;
      calculating the difference between successive averages;
      determining whether the difference is less than a predetermined value; and
      outputting a calculated average temperature.

2. The method of claim 1, wherein successively calculating the average of up to all of the plurality of stored measurements comprises discarding readings from the time window.

3. The method of claim 2, wherein the discarded readings are selected from a group consisting of peak readings, high readings, and low readings.

4. The method of claim 1, further comprising moving the time window upon determining that the difference is not less than the predetermined value, and wherein successively calculating the average of up to all of the plurality of stored measurements is performed upon determining that the difference is not less than the predetermined value.

5. The method of claim 1, wherein outputting the calculated average temperature is performed upon determining that the difference is less than the predetermined value.

6. The method of claim 1, wherein the stored plurality of most recent temperature measurements in the moving time window comprises calculated temperatures.

7. The method of claim 1, wherein the radiation sensor comprises a thermopile sensor.

8. A method of detecting human body temperature, the method comprising:
   detecting temperature at a forehead through plural temperature measurements, wherein the plural temperature measurements are made using a temperature detector comprising a radiation sensor which views a target surface area of the forehead, the temperature detector further comprising an extension for placement against the forehead. wherein the extension forms an air pocket isolating a portion of the forehead from air flow outside the air pocket: and
   computing a body temperature as a function of ambient temperature and the detected temperature, wherein computing the body temperature comprises:
      storing a plurality of most recent temperature measurements in a moving time window;
      successively calculating an average of up to all of the plurality of stored measurements;
      calculating the difference between successive averages;
      determining whether the difference is less than a predetermined value; and
      outputting a calculated average temperature.

9. The method of claim 8, wherein successively calculating the average of up to all of the plurality of stored measurements comprises discarding readings from the time window.

10. The method of claim 9, wherein the discarded readings are selected from a group consisting of peak readings, high readings, and low readings.

11. The method of claim 8, further comprising moving the time window upon determining that the difference is not less than the predetermined value, and wherein successively calculating the average of up to all of the plurality of stored measurements is performed upon determining that the difference is not less than the predetermined value.

12. The method of claim 8, wherein outputting the calculated average temperature is performed upon determining that the difference is less than the predetermined value.

13. The method of claim 8, wherein the stored plurality of most recent temperature measurements in the moving time window comprises calculated temperatures.

* * * * *

UNITED STATES PATENT AND TRADEMARK OFFICE
CERTIFICATE OF CORRECTION

PATENT NO. : 6,991,368 B2  
APPLICATION NO. : 10/246246  
DATED : January 31, 2006  
INVENTOR(S) : Jonathan Gerlitz Page 1 of 1

It is certified that error appears in the above-identified patent and that said Letters Patent is hereby corrected as shown below:

On Page 1, in Col. 2, ("Foreign Patent Documents"), after "1/2001" insert
-- G01K 13/00 --.

On Page 2, in Col. 2, ("Foreign Patent Documents"), after "2/2001" insert
-- A61B5/00 --.

On Page 2, in Col. 2 ("Foreign Patent Documents"), after "9/2003" insert
-- A61B 05/01 --.

In Col. 4, Line 53, delete -- car -- and insert -- ear --.

In Col. 8, Lines 5-6, Claim 1, delete -- temperatures -- and insert -- temperature --.

In Col. 8, Line 44, Claim 8, delete -- forehead. -- and insert -- forehead, --.

In Col. 8, Line 46, Claim 8, after "pocket" delete -- . -- [period] and insert
-- ; -- [semicolon].

Signed and Sealed this

Eighteenth Day of July, 2006

JON W. DUDAS  
*Director of the United States Patent and Trademark Office*